United States Patent
Zhang et al.

(10) Patent No.: US 10,599,549 B2
(45) Date of Patent: Mar. 24, 2020

(54) PACKET BACKPRESSURE DETECTION METHOD, APPARATUS, AND DEVICE

(71) Applicant: HUAWEI TECHNOLOGIES CO., LTD., Shenzhen, Guangdong (CN)

(72) Inventors: Bin Zhang, Hangzhou (CN); Ligang Chen, Shenzhen (CN); Jiahuai Chen, Hangzhou (CN); Lixia Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/250,168

(22) Filed: Jan. 17, 2019

(65) Prior Publication Data
US 2019/0146895 A1 May 16, 2019

Related U.S. Application Data

(63) Continuation of application No. PCT/CN2016/106134, filed on Nov. 16, 2016.

(51) Int. Cl.
*G06F 21/88* (2013.01)
*G06F 11/34* (2006.01)
(Continued)

(52) U.S. Cl.
CPC ...... *G06F 11/3485* (2013.01); *G06F 11/3041* (2013.01); *G06F 13/20* (2013.01);
(Continued)

(58) Field of Classification Search
None
See application file for complete search history.

(56) References Cited

U.S. PATENT DOCUMENTS 5,829,051 A * 10/1998 Steely, Jr. ........... G06F 12/0864
711/216
8,730,983 B1 5/2014 Akhter et al.
(Continued)

FOREIGN PATENT DOCUMENTS

CN 101035076 A 9/2007
CN 101202707 A 6/2008
(Continued)

OTHER PUBLICATIONS

PCI Express® Base Specification Revision 3.1 Oct. 8, 2014, 1075 pages.
(Continued)

*Primary Examiner* — Hyun Nam
(74) *Attorney, Agent, or Firm* — James Anderson Harrison

(57) ABSTRACT

A packet backpressure detection method and apparatus are provided. The method includes: a device which having a Peripheral Component Interconnect Express (PCIe) port storing a plurality of packets for transmission in a packet queue and storing a packet that is to be transmitted next in a first buffer, where the queue comprises a plurality of packets that are to be transmitted via the PCIe port; and the queue is stored in a second buffer; recording a storage duration of each packet stored in the first buffer, and accumulating the storage duration of each packet stored in the first buffer; removing the packet from the first buffer after the packet is transmitted via the PCIe port; and generating an indication of packet pressure at the PCIe port based on the accumulated storage duration.

21 Claims, 10 Drawing Sheets

(51) Int. Cl.
  *G06F 13/40* (2006.01)
  *G06F 13/42* (2006.01)
  *H04L 12/861* (2013.01)
  *G06F 11/30* (2006.01)
  *G06F 13/20* (2006.01)

(52) U.S. Cl.
  CPC ...... *G06F 13/4022* (2013.01); *G06F 13/4269* (2013.01); *G06F 13/4282* (2013.01); *H04L 49/90* (2013.01); *G06F 2213/0026* (2013.01)

(56) References Cited

U.S. PATENT DOCUMENTS

| | | | |
|---|---|---|---|
| 9,152,564 B2 | 10/2015 | Mital et al. | |
| 2005/0157676 A1* | 7/2005 | Kwak | H04W 28/14 370/328 |
| 2006/0085489 A1* | 4/2006 | Tomic | G06F 12/123 |
| 2009/0161685 A1 | 6/2009 | Du et al. | |
| 2013/0091330 A1 | 4/2013 | Mital et al. | |
| 2013/0100812 A1 | 4/2013 | Snyder, II et al. | |
| 2014/0254357 A1 | 9/2014 | Agarwal et al. | |
| 2015/0006780 A1 | 1/2015 | Shao | |
| 2015/0146575 A1* | 5/2015 | Singh | H04L 45/16 370/256 |
| 2015/0180924 A1* | 6/2015 | O'Callaghan | H04L 65/605 709/219 |
| 2016/0173354 A1* | 6/2016 | Zhao | H04L 43/04 370/232 |
| 2016/0294709 A1 | 10/2016 | Xu et al. | |
| 2017/0332426 A1* | 11/2017 | Wu | H04W 4/70 |
| 2019/0042489 A1* | 2/2019 | Nagabhushana | G06F 3/0613 |

FOREIGN PATENT DOCUMENTS

| | | |
|---|---|---|
| CN | 101489263 A | 7/2009 |
| CN | 102932263 A | 2/2013 |
| CN | 103402245 A | 11/2013 |
| CN | 103701710 A | 4/2014 |
| CN | 104618083 A | 5/2015 |
| EP | 2854446 A1 | 4/2015 |
| EP | 3073688 A1 | 9/2016 |
| JP | H11122256 A | 4/1999 |
| WO | 2016128193 A1 | 8/2016 |

OTHER PUBLICATIONS

D.I. Miretskiy et al, Backpressure-based control protocols: Design and computational aspects. 2009 21st International Teletraffic Congress, Oct. 30, 2009, 8 pages.

* cited by examiner

--Prior Art--

--Prior Art--

to be sent at the PCIe port, the
PACKET BACKPRESSURE DETECTION METHOD, APPARATUS, AND DEVICE

CROSS-REFERENCE TO RELATED APPLICATIONS

This application is a continuation of International Application No. PCT/CN2016/106134, filed on Nov. 16, 2016, which claims priority to International Application No. PCT/CN2016/101304, filed on Sep. 30, 2016. The disclosures of the aforementioned applications are hereby incorporated by reference in their entireties.

TECHNICAL FIELD

This application relates to the field of computer technologies, and in particular, to a packet backpressure detection method, apparatus, and device.

BACKGROUND

In a Peripheral Component Interconnect Express (PCIe) system, devices having PCIe ports may transmit a packet by using the PCIe ports. For example, a central processing unit (CPU) is connected to an upstream port (UP) of a PCIe switch by using a PCIe port, and a downstream port (DP) of the PCIe switch is connected to an endpoint (EP) device. When the CPU sends a packet to the EP, first, the CPU sends the packet to the UP of the PCIe switch; next, the UP of the PCIe switch sends the packet to the DP connected to the EP; and next, the DP sends the packet to the EP.

When a link between two PCIe ports becomes faulty, to-be-sent packets are piled up at a PCIe port, that is, packet backpressure occurs. If packet backpressure cannot be detected in a timely manner, instruction timeout occurs in a device for sending a packet. Consequently, the device hangs (hang), and cannot work normally.

An existing packet backpressure detection method is as follows: All to-be-sent packets at a PCIe port are stored in a cache unit. A timer is set for each packet stored in the cache unit, and records storage duration of the packet in the cache unit. When a timer that is set for any packet expires, it is determined that packet backpressure occurs at the PCIe port, and an error packet indicating packet backpressure at the PCIe port is sent to an error processing unit.

However, one device may include multiple PCIe ports, and generally, a large quantity of to-be-sent packets are stored in a cache unit at each PCIe port. In the packet backpressure detection method in the prior art, a large quantity of timer resources are applied for, and an error processing unit receives a large quantity of error processing reports. Consequently, bandwidth within a device is excessively occupied, and resources within the device are wasted.

SUMMARY

This application provides a packet backpressure detection method, apparatus, and device, so as to resolve a prior-art problem that there is an overlarge quantity of overheads in a packet backpressure detection solution.

According to a first aspect, this application provides a packet backpressure detection method, where the method is applied to a device having a PCIe port. The device may be a CPU, a PCIe switch, or an endpoint (EP) device that has a PCIe port. When the device is a CPU, the PCIe port is a PCIe port of the CPU. for example, a root port (RP) of the CPU running a root complex (RC). When the device is a PCIe switch, the PCIe port is either an upstream port or a downstream port of the PCIe switch. When the device is an EP, the PCIe port is a PCIe port by which the EP is connected to another device in a PCIe system. When each to-be-sent packet in a packet sending queue of the PCIe port becomes a packet that currently needs to be sent at the PCIe port, the device stores, in a buffer, the packet that currently needs to be sent, where the packet stored in the buffer is removed from the buffer after being sent by using the PCIe port. The buffer stores a maximum of one packet at any moment. The buffer may be an independent storage component, such as a random access memory (RAM) or a flash (Flash); or may be a storage area obtained by dividing the storage component. The device records storage duration of each packet stored in the buffer, and accumulates the recorded storage duration of each packet, so as to obtain accumulated duration of packet storage in the buffer; and when the accumulated duration reaches a first threshold, determines that packet backpressure occurs at the PCIe port. The function of recording the storage duration of each packet stored in the buffer may be implemented by a hardware module having a timing function in the device, or may be implemented by executing an application program by a CPU of the device.

In the solution in which the device determines that packet backpressure occurs at the PCIe port, for packet backpressure in one direction of one PCIe port, timing is performed only on storage duration of one packet in the buffer at any moment. Therefore, compared with a prior-art solution in which timing is simultaneously performed on all to-be-sent packets at a PCIe port, this solution can substantially reduce system overheads. In addition, when packet backpressure occurs at the PCIe port due to link failure, the device generates a packet backpressure error only once for the link failure, thereby avoiding occurrence of an error storm and improving system stability. Moreover, because whether packet backpressure occurs is determined according to the accumulated duration of packet storage in the buffer, the following case can be avoided: although storage duration of no packet exceeds a specified threshold, a device for sending a packet cannot work normally because an accumulated value of storage duration of multiple packets is excessively large.

In an optional implementation, a capacity of the buffer may be that at least two packets can be stored. Multiple packets are sorted according to a sending sequence in a cache unit. The capacity of the buffer is less than a capacity of the cache unit. A processor of the device is configured to: record storage duration of a packet in the buffer, where the packet is the first packet in a packet queue of the buffer, and accumulate recorded storage duration of each packet, so as to obtain accumulated duration of packet storage in the buffer; and when the accumulated duration reaches the first threshold, determine that packet backpressure occurs at the PCIe port.

In an optional implementation, the device may directly set a value of the accumulated duration to the first threshold, and subtract the storage duration of each packet from the accumulated duration each time after recording storage duration of a packet in the buffer. When the accumulated duration is less than or equal to 0, the device determines that packet backpressure occurs. By using this method, a prior-art problem can be resolved, system overheads are reduced, and accuracy of packet backpressure detection is improved.

In an optional implementation, the device reduces the recorded accumulated duration of packet storage in the buffer in a preset condition. A reduction manner includes: resetting the accumulated duration to 0, or subtracting storage duration of a sent packet from the accumulated duration. In this implementation, a case in which the device determines that packet backpressure occurs at the PCIe port because accumulated storage duration of an overlarge quantity of normal packets other than backpressure packets reaches the first threshold can be avoided, and accuracy of packet backpressure detection is improved.

In an optional implementation, the device resets the accumulated duration of packet storage in the buffer to 0 in a preset condition. In this implementation, a case in which the device determines that packet backpressure occurs at the PCIe port because accumulated storage duration of an overlarge quantity of normal packets other than backpressure packets reaches the first threshold can be avoided, and accuracy of packet backpressure detection is improved.

In an optional implementation, the device sets a resetting timer, performs timing, and when a time recorded by the resetting timer reaches a second threshold, resets the accumulated duration of packet storage in the buffer to 0. The resetting timer may be implemented by executing an application program instruction by a processor of the device, or may be implemented by a hardware module used as a timer in the device. In this implementation, a case in which the device determines that packet backpressure occurs at the PCIe port because accumulated storage duration of an overlarge quantity of normal packets other than backpressure packets reaches the first threshold can be avoided, and accuracy of packet backpressure detection is improved.

In an optional implementation, a value of the resetting timer may be directly set to a second threshold, and decreases gradually on a basis of the second threshold. When the value of the resetting timer is equal to 0, the accumulated duration is reset to 0.

In an optional implementation, the device records a quantity of packets that have been stored in the buffer, and when the recorded quantity reaches a third threshold, resets the accumulated duration of packet storage in the buffer to 0. The counting function may be implemented by executing an application program instruction by a processor of the device, or may be implemented by a hardware module used as a counter in the device. In this implementation, a case in which the device determines that packet backpressure occurs at the PCIe port because accumulated storage duration of an overlarge quantity of normal packets other than backpressure packets reaches the first threshold can be avoided, and accuracy of packet backpressure detection is improved.

In an optional implementation, the storage duration that is of each packet in the buffer and is successively recorded by the device forms a duration queue. When a length of the duration queue reaches a fourth threshold, the device deletes earliest-recorded storage duration from the duration queue, and subtracts, from the accumulated duration, the earliest-recorded storage duration that is deleted from the duration queue. In this implementation, the accumulated duration is a sum of storage duration, in the buffer, of a specified quantity (a value of the specified quantity is the fourth threshold) of packets recently cached in the buffer, and a peak value of packet storage duration does not fall within two statistical units, so that it is ensured that the peak value of packet storage duration can always be detected, and sensitivity of packet backpressure detection is improved.

In an optional implementation, the storage duration that is of each packet in the buffer and is successively recorded by the device forms a duration queue. The device accumulates all the duration in the duration queue, so as to obtain window duration, and when a length of the duration queue reaches a fourth threshold, the device deletes earliest-recorded storage duration from the duration queue, and subtracts, from the window duration, the earliest-recorded storage duration that is deleted from the duration queue. When the window duration reaches a sixth threshold, the device determines that packet backpressure occurs at the PCIe port. Because the window duration is not reset to 0, it is ensured that a peak value of packet storage duration can always be detected, and sensitivity of packet backpressure detection is improved.

In an optional implementation, when recorded storage duration of any packet in the buffer reaches a fifth threshold, the device determines that packet backpressure occurs at the PCIe port, where the fifth threshold is less than the first threshold. In this implementation, the device determines that packet backpressure occurs, provided that storage duration of any packet is greater than the fifth threshold. Therefore, when a packet is cached in the buffer for an excessively long time but the accumulated duration does not exceed the first threshold, the device determines as soon as possible that packet backpressure occurs, so that sensitivity of packet backpressure detection performed by the device is improved.

In an optional implementation, when each to-be-sent packet in a packet sending queue in a first direction of the PCIe port becomes a packet that currently needs to be sent at the PCIe port, the device stores, in the buffer, the packet that needs to be sent in the first direction, where the first direction is an upstream direction or a downstream direction of the PCIe port. When each to-be-sent packet in a packet sending queue in a second direction of the PCIe port becomes a packet that currently needs to be sent at the PCIe port, the device stores, in a second buffer, the packet that needs to be sent in the second direction, where the second direction is opposite to the first direction, the packet stored in the second buffer is removed from the second buffer after being sent by using the PCIe port, and the second buffer stores a maximum of one packet at any moment. The device records storage duration of each packet stored in the second buffer, and accumulates the recorded storage duration of each packet stored in the second buffer, so as to obtain second accumulated duration of packet storage in the second buffer. When the second accumulated duration reaches the first threshold, the device determines that packet backpressure occurs at the PCIe port. In this implementation, the device can detect packet backpressure that occurs in to-be-sent packets in upstream and downstream directions of one port of the PCIe switch, so that sensitivity and pertinence of packet backpressure detection are improved.

Optionally, a capacity of the second buffer may be that at least two packets can be stored, and the capacity of the second buffer is less than a capacity of a cache unit.

In an optional implementation, the device further includes a second PCIe port. The device is further configured to: when each to-be-sent packet in a packet sending queue of the second PCIe port becomes a packet that currently needs to be sent at the second PCIe port, store, in a third buffer, the packet that needs to be sent at the second PCIe port, where the packet stored in the third buffer is removed from the third buffer after being sent by using the second PCIe port, and the third buffer stores a maximum of one packet at any moment; record storage duration of each packet stored in the third buffer, and accumulate the recorded storage duration of each packet stored in the third buffer, so as to obtain third accumulated duration of packet storage in the third buffer; and when the third accumulated duration reaches the first threshold, determine that packet backpressure occurs at the second PCIe port. In this implementation, the device can detect packet backpressure that occurs at multiple PCIe ports, so that efficiency of packet backpressure detection is improved.

Optionally, a capacity of the third buffer may be that at least two packets can be stored, and the capacity of the third buffer is less than a capacity of a cache unit.

According to a second aspect, this application provides a packet backpressure detection apparatus, where the apparatus is configured to execute the method according to any one of the first aspect, or optional implementations of the first aspect. Specifically, the apparatus includes a module configured to execute the method according to any one of the first aspect, or optional implementations of the first aspect.

According to a third aspect, this application provides a packet backpressure detection device, where the device is configured to execute the method according to any one of the first aspect, or optional implementations of the first aspect. Specifically, the device includes a bus, and a PCIe port, a memory, and a processor that are separately connected to the bus. The PCIe port is configured to send a packet. The memory is configured to store a packet sending queue of the PCIe port. The processor is configured to execute the method according to any one of the first aspect, or optional implementations of the first aspect.

According to a fourth aspect, this application provides a computer-readable medium, configured to store a computer program, where the computer program includes an instruction used to execute the method according to any one of the first aspect, or optional implementations of the first aspect.

In this application, combination may be further made on a basis of the implementations provided in the foregoing aspects, so as to provide more implementations.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description show only some embodiments of this application, and persons of ordinary skill in the art may still derive other drawings from these accompanying drawings without creative efforts.

DESCRIPTION OF EMBODIMENTS

To facilitate understanding of the embodiments of this application, the following first describes a PCIe system and a packet backpressure detection method in the prior art.

Figure 1:
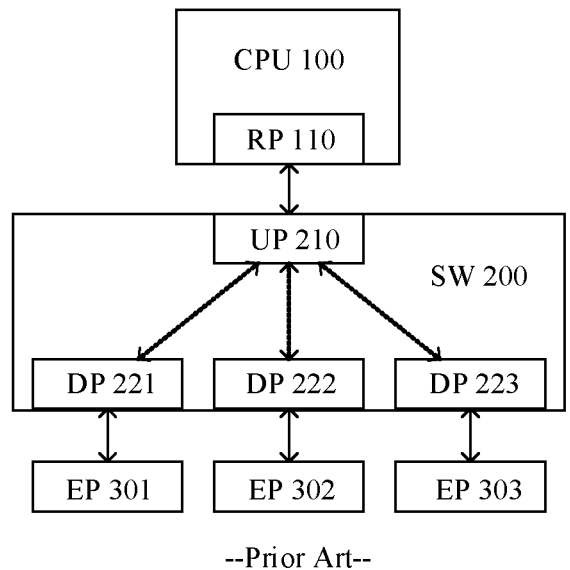
FIG. 1 is a schematic diagram of a PCIe system.

FIG. 1 is a schematic diagram of a possible implementation of a PCIe system. An RP 110 is a PCIe port of a CPU 100. An SW 200 is a PCIe switch (SW). A UP 210 is an upstream port of the SW 200, a DP 221 to a DP 223 are downstream ports of the SW 200, and an EP 301 to an EP 303 are endpoint devices. The CPU 100 may be a set of multiple CPUs.

The UP 210 is configured to: receive, from the RP 110 of the CPU 100, a packet to be sent by the CPU 100 to an EP, and send the packet to a DP connected to the EP. For example, after receiving a packet to be sent by the CPU 100 to the EP 301, the UP 210 sends the packet to the DP 221 connected to the EP 301, and uses the DP 221 to send the packet to the EP 301.

When a link between a DP and an EP becomes faulty, packets to be sent by the CPU to the EP are piled up at the DP, and packet backpressure occurs. If packet backpressure is not found in a timely manner, packet processing in the CPU slows down or becomes stale, and serious instruction timeout even occurs in the CPU. Consequently, the CPU hangs, and cannot work normally.

Figure 2:
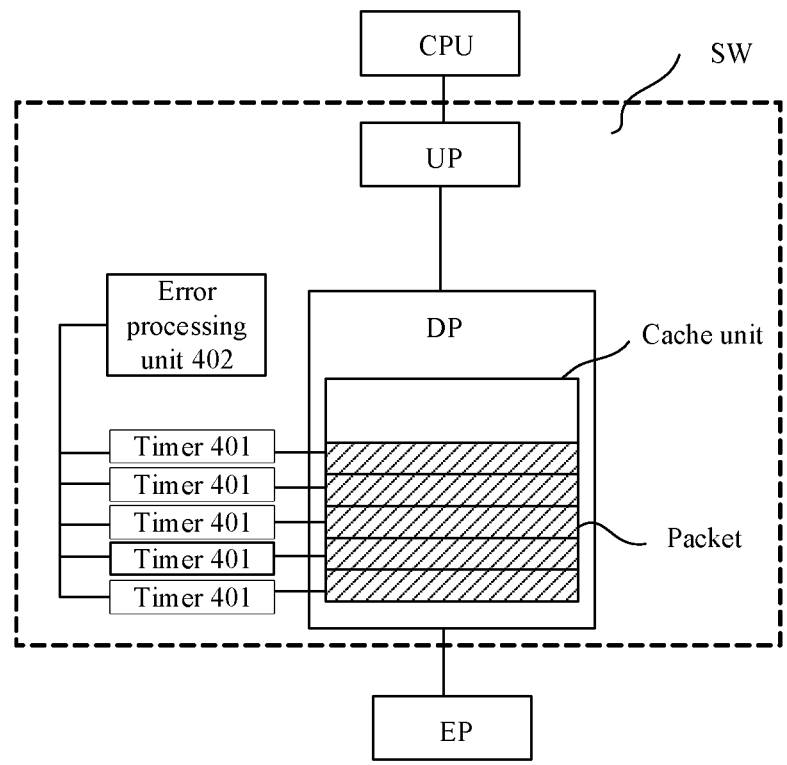
FIG. 2 is a schematic diagram of a packet backpressure detection method in the prior art.

FIG. 2 shows a packet backpressure detection method in the prior art. In this method, all to-be-sent packets at a DP of a PCIe switch are stored in a cache unit. A timer 401 is set for each packet stored in the cache unit, and is configured to record storage duration of the packet in the cache unit. After the packet is sent from a PCIe port, the timer terminates timing performed on the storage duration of the packet. If the timer 401 expires, it indicates that the packet is stored in the cache unit for an excessively long time. In other words, the packet fails to be sent from the PCIe port within timeout duration, and it indicates that packet backpressure occurs at the PCIe port. The timer 401 reports, to an error processing unit 402, an error report indicating that backpressure occurs at the PCIe port.

However, the PCIe switch includes multiple DPs, and multiple packets (for example, 128 packets) can be cached in a cache unit of each DP. If a timer is set for each packet at each DP, a large quantity of timers need to be set in the PCIe switch. Consequently, system overheads increase substantially. In addition, once a link between a DP and an EP becomes faulty, after a timer corresponding to a packet in a cache unit of the DP expires, timers corresponding to a large quantity of other packets in the cache unit expire one after another, the error processing unit 402 receives a large quantity of error reports indicating that packet backpressure occurs at one PCIe port, an error report storm even occurs, and a difficulty in resolving a packet backpressure problem by the error processing unit 402 is increased. Consequently, bandwidth within a device is excessively occupied, resources within the device are wasted, and normal processing of packet backpressure at the PCIe port by the error processing unit 402 is affected.

To resolve the foregoing problems in the prior art, the embodiments of this application provide a packet backpressure detection method and apparatus. The following describes technical solutions of this application in detail with reference to the accompanying drawings and specific embodiments. It should be understood that the embodiments of this application and specific features of the embodiments are intended to describe the technical solutions of this application in detail, but are not intended to limit the technical solutions of this application. The embodiments of this application and the technical features of the embodiments may be combined with each other if they do not conflict with each other.

Figure 3:
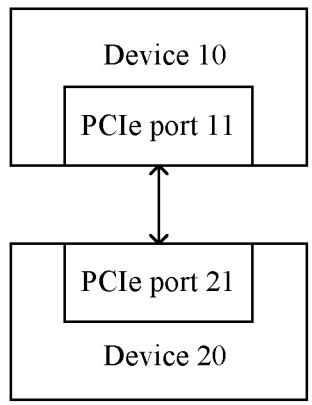
FIG. 3 is a schematic diagram of a PCIe system according to an embodiment of this application.

FIG. 3 shows a schematic diagram of a PCIe system in an embodiment of this application. A device 10 includes a PCIe port 11, and a device 20 includes a PCIe port 21. A packet is transmitted between the device 10 and the device 20 by using a link between the PCIe port 11 and the PCIe port 21.

Figure 4:
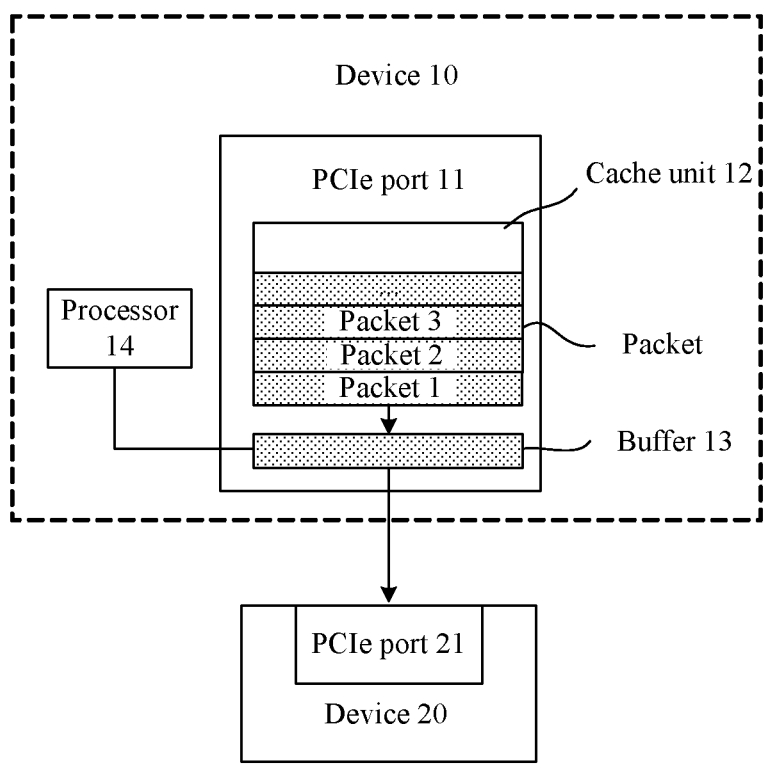
FIG. 4 is a schematic diagram of a detailed structure of a device 10 according to an embodiment of this application.

In the following, an example that the device 10 detects packet backpressure that occurs at the PCIe port 11 is used for description. FIG. 4 is a schematic diagram of a detailed structure of the device 10. A cache unit 12 is configured to store a to-be-sent packet of the PCIe port 11. When each to-be-sent packet in a packet sending queue of the PCIe port 11 becomes a packet that currently needs to be sent at the PCIe port 11, the device 10 stores, in a buffer 13, the packet that currently needs to be sent. The packet stored in the buffer 13 is removed from the buffer after being sent by using the PCIe port 11. The buffer stores a maximum of one packet at any moment. For example, the packet sending queue of the PCIe port 11 is {packet 1, packet 2, packet 3, . . . }. The packet 1 is the first packet in the packet sending queue, that is, a packet that is in the packet sending queue of the PCIe port and that currently needs to be sent. The packet 1 is stored in the buffer 13. After the packet 1 is sent by using the PCIe port 11, the stored packet 1 is removed from the buffer 13, and the packet 2 that is in a packet sending queue {packet 2, packet 3, . . . } obtained after the packet 1 is sent and that currently needs to be sent is stored, and so on. The buffer 13 is configured to store, at any moment, one packet that is in the packet sending queue of the PCIe port and that currently needs to be sent. The buffer 13 can store another packet only after the stored packet is sent from the PCIe port 11. The buffer 13 may be an independent register or another storage device, such as a random access memory RAM or a flash; or the buffer 13 may be a storage area obtained by dividing a register or another storage device.

It should be noted that for packets in the cache unit, a sending sequence of the packets may be determined according to packet priorities carried in a request message, or the packets may be sorted according to a preset arbitration policy, and the packets are sent according to a sequence. The present invention imposes no limitation.

Optionally, a capacity of the buffer 13 may be that at least two packets in the cache unit 12 can be stored. Multiple packets are sorted according to a sending sequence in the cache unit 12. For example, both the packet 1 and the packet 2 in the cache unit 12 in FIG. 4 are stored in the buffer 13. The packet 1 is the first packet in the packet queue of the cache unit 12, that is, a packet that is in the packet sending queue of the PCIe port and that currently needs to be sent. The packet 2 is the second packet that needs to be sent in the cache unit 12. The device 10 stores the packet 2 in the buffer 13 in advance, so as to prefetch a to-be-sent packet in the cache unit 12, thereby reducing packet processing duration and improving packet processing efficiency.

A processor 14 is responsible for detecting packet backpressure that occurs at the PCIe port 11. Specifically, the processor 14 is configured to: record storage duration of each packet stored in the buffer, and accumulate the recorded storage duration of each packet, so as to obtain accumulated duration of packet storage in the buffer; and when the accumulated duration reaches a first threshold, determine that packet backpressure occurs at the PCIe port 11.

Optionally, when multiple packets are stored in the buffer, the processor 14 is configured to record storage duration of one packet in the buffer. The packet is the first packet in the packet queue of the buffer. For example, as shown in FIG. 4, if a sequence of to-be-sent packets in the cache unit 12 is {packet 1, packet 2, packet 3, . . . } and two packets are allowed to store in the device 10, when the packet 1 and the packet 2 are stored in the buffer 13, a detection sequence of the packet queue of the buffer 13 is {packet 1, packet 2}, and the processor 14 is configured to record storage duration of the packet 1. After the packet 1 is sent from the PCIe port, a detection sequence of the packet queue of the buffer 13 is {packet 2, packet 3}, and the processor 14 is configured to record storage duration of the packet 2; and so on. The processor 14 is configured to: record storage duration of the first packet in the packet queue of the buffer 13, and accumulate recorded storage duration of each packet, so as to obtain the accumulated duration of packet storage in the buffer; and when the accumulated duration reaches the first threshold, determine that packet backpressure occurs at the PCIe port 11.

The processor 14 may be a processing component, or may be a set of multiple processing components. The processor 14 may be an application-specific integrated circuit (ASIC), or one or more integrated circuits configured to control program execution of the solution of the present invention. Alternatively, the processor 14 is a general purpose processor, such as a central processing unit CPU. The CPU reads an application program instruction in a memory that is in the device 10 and that is used to store an executable instruction, and executes the application program instruction, so as to implement functions implemented by the processor 14.

In the solution in which the device 10 determines that packet backpressure occurs at the PCIe port 11, timing is performed, at any moment, only on storage duration of a packet stored in the buffer 13, and a quantity of packets stored in the buffer 13 is not greater than 1. Therefore, compared with a prior-art solution in which timing is simultaneously performed on all to-be-sent packets at a PCIe port, this solution can substantially reduce system overheads. In addition, when packet backpressure occurs at the PCIe port due to link failure, the device 10 generates a packet backpressure error only once for the link failure, thereby avoiding occurrence of an error storm and improving system stability. Moreover, because whether packet backpressure occurs is determined according to the accumulated duration of packet storage in the buffer, the following case can be avoided: although storage duration of no packet exceeds a specified threshold, the device cannot work normally because an accumulated value of storage duration of multiple packets is excessively large.

Optionally, the processor 14 of the device 10 may set a value of the accumulated duration to the first threshold, and subtract the storage duration of each packet from the accumulated duration each time after recording storage duration of a packet in the buffer 13. When the accumulated duration is less than or equal to 0, the device 10 determines that packet backpressure occurs. By using this method, a prior-art problem can be resolved, system overheads are reduced, and accuracy of packet backpressure detection is improved.

Optionally, the processor 14 is further configured to reduce the recorded accumulated duration of packet storage in the buffer 13 in a preset condition, so that a case in which the processor 14 determines that packet backpressure occurs at the PCIe port because accumulated storage duration of an overlarge quantity of normal packets other than backpressure packets reaches the first threshold can be avoided, and accuracy of packet backpressure detection is improved.

Optionally, an implementation in which the processor 14 reduces the recorded accumulated duration of packet storage in the buffer 13 in the preset condition is that the processor 14 resets the accumulated duration of packet storage in the buffer 13 to 0 in a preset condition.

Optionally, an implementation in which the processor 14 resets the accumulated duration of packet storage in the buffer 13 to 0 in the preset condition is to set a resetting timer, perform timing, and when a time recorded by the resetting timer reaches a second threshold, reset the accumulated duration of packet storage in the buffer 13 to 0.

Specifically, the time recorded by the resetting timer is a system runtime, that is, the time recorded by the resetting timer starts timing after the device 10 is started. The time recorded by the resetting timer is an uninterrupted accumulated time, including a time in which each packet is stored in the buffer, a time in which a packet is moved from the cache unit to the buffer, a time in which the packet is removed from the buffer, and a time in which the buffer is idle. The accumulated duration recorded by the processor 14 is only used to record storage duration of a packet in the buffer 13, and a recorded time is an accumulation of multiple time segments. In addition, the second threshold is greater than the first threshold.

When the accumulated duration recorded by the processor 14 reaches the first threshold, it may be determined that packet backpressure occurs, but no processing is performed on the accumulated duration. When the time recorded by the resetting timer reaches the second threshold, the accumulated duration of packet storage in the buffer 13 is reset to 0, so as to improve accuracy of packet backpressure detection.

Optionally, a value of the resetting timer may be directly set to a second threshold, and decreases gradually on a basis of the second threshold. When the value of the resetting timer is equal to 0, the accumulated duration is reset to 0.

Optionally, an implementation in which the processor 14 resets the accumulated duration of packet storage in the buffer 13 to 0 in the preset condition is to record a quantity of packets that have been stored in the buffer 13, and when the recorded quantity reaches a third threshold, reset the accumulated duration of packet storage in the buffer 13 to 0.

Optionally, an implementation in which the processor 14 reduces the recorded accumulated duration of packet storage in the buffer 13 in the prereset condition is as follows: the storage duration that is of each packet in the buffer 13 and is successively recorded forms a duration queue. When a length of the duration queue reaches a fourth threshold, the processor deletes earliest-recorded storage duration from the duration queue, and subtracts, from the accumulated duration, the earliest-recorded storage duration that is deleted from the duration queue. In this implementation, the duration queue is similar to a window having a fixed length. When a new packet is stored in the buffer 13, the window moves, so that the accumulated duration is a sum of storage duration, in the buffer 13, of a specified quantity (a value of the specified quantity is the fourth threshold) of packets recently cached in the buffer. By using the window having the fixed length, a peak value of packet storage duration does not fall within two statistical period, so that it is ensured that the peak value of the packet storage duration can always be detected, and sensitivity of packet backpressure detection is improved.

Optionally, the processor 14 is further configured to: when recorded storage duration of any packet in the buffer 13 reaches a fifth threshold, determine that packet backpressure occurs at the PCIe port 11, where the fifth threshold is less than the first threshold. In this implementation, when a packet is cached in the buffer 13 for an excessively long time but the accumulated duration does not exceed the first threshold, the processor can determine as soon as possible that packet backpressure occurs at the PCIe port 11, so that sensitivity of packet backpressure detection is improved.

In this embodiment of this application, the device 10 may be a CPU, and the PCIe port 11 is a PCIe port of the CPU, such as a root port (RP) of a root complex (RC) of the CPU. The device 20 connected to the CPU may be a switch or an EP. Alternatively, the device 10 may be a PCIe switch, and the PCIe port 11 is a UP or a DP of the PCIe switch. When the PCIe port 11 is a UP, the device 20 is a CPU or a DP of another switch. When the PCIe port 11 is a DP, the device 20 is an EP or a UP of another switch. When the PCIe port 11 used as a DP is a non-transparent (NT) port, the device 20 may be a CPU. Alternatively, the device 10 may be an EP, and the device 20 may be a CPU or switch connected to the EP; or the device 10 is an EP used as a root complex (RC) in an extended PCIe structure, the PCIe port 11 is a port of the RC in the extended PCIe structure, and the device 20 is a switch, another EP, or a CPU.

By using an example that the device 10 is a PCIe switch, the following describes a packet backpressure detection method provided in an embodiment of this application.

Figure 5:
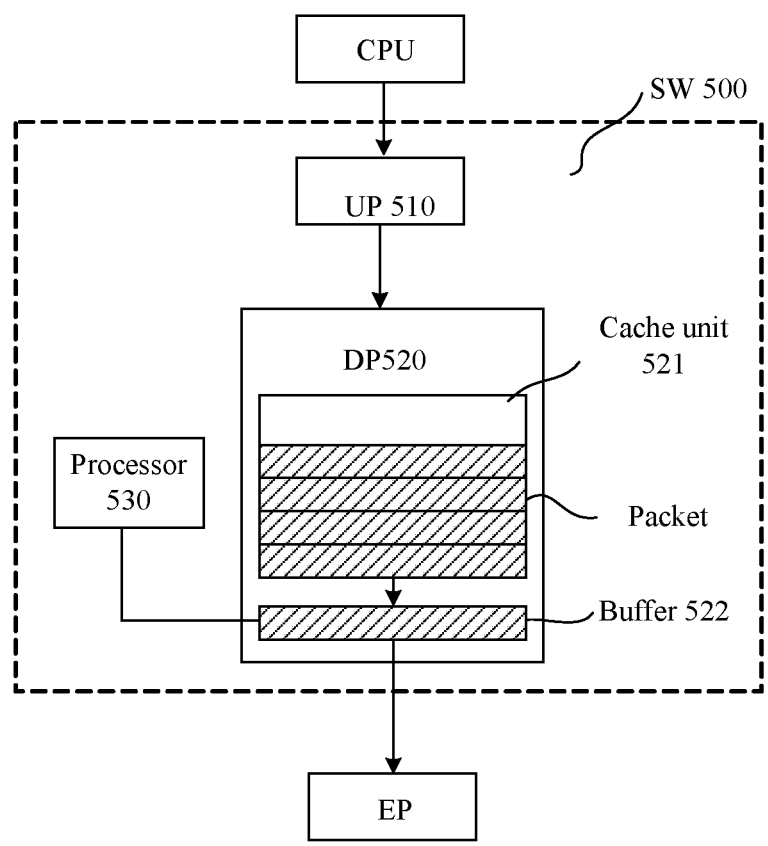
FIG. 5 is a schematic structural diagram of a PCIe switch according to an embodiment of this application.

FIG. 5 is a schematic diagram of a PCIe switch SW 500 according to an embodiment of this application. The SW 500 includes a UP 510 used for connecting to a CPU and a DP 520 used for connecting to an EP. The SW 500 may include at least one DP, and the DP 520 is any one DP of the SW 500. At the DP 520, there is one or more packets to be sent to the EP, and these packets form a packet sending queue. The DP 520 sends the packets successively according to a sequence of the packets in the packet sending queue. These to-be-sent packets are stored in a cache unit 521 and a buffer 522. The buffer 522 stores the first packet in the packet sending queue, that is, a packet that currently needs to be sent, and the buffer 522 stores a maximum of one packet at any moment. The cache unit 521 is configured to store the second packet and a subsequent packet in the packet sending queue. When a packet stored in the buffer 522 is sent to the EP by using the DP 520, a packet that is previously stored in the cache unit 521 and that needs to be first sent becomes a packet that currently needs to be sent at the DP 520, and is moved from the cache unit 521 to the buffer 522.

Optionally, a capacity of the buffer 522 may be that at least two packets can be stored. The capacity of the buffer 522 is less than a capacity of the cache unit. Multiple packets are sorted according to a sending sequence in the cache unit 521.

The SW 500 further includes a processor 530, configured to: record storage duration of each packet stored in the buffer 522, and accumulate the recorded storage duration of each packet, so as to obtain accumulated duration of packet storage in the buffer 522; and when the accumulated duration reaches a first threshold, determine that packet backpressure occurs at the DP 520. For an implementation of the processor 530, refer to the implementation of the processor 14.

Persons skilled in the art may know that FIG. 5 shows only an example of a packet backpressure detection solution used when the device 10 is a PCIe switch, and FIG. 5 cannot limit the protection scope of this application. For example, when the DP 520 is an NT port, the DP 520 may be connected to another CPU. For another example, the buffer 522 is configured to store a packet that is in a sending queue of packets to be sent by the DP 520 to the UP 510 and that currently needs to be sent. The processor 530 determines, according to accumulated duration of packet storage in the buffer 522, whether packet backpressure occurs in a packet sending direction from the DP 520 to the UP 510. Likewise, the packet backpressure detection method is also applicable to detecting whether packet backpressure occurs in a packet sending direction from the UP 510 to the DP 520, and is applicable to detecting whether packet backpressure occurs in a packet sending direction from the UP 510 to the CPU.

Optionally, the device 10 may set a value of the accumulated duration to the first threshold, and subtract the storage duration of each packet from the accumulated duration each time after recording storage duration of a packet in the buffer 522. When the accumulated duration is less than or equal to 0, the device 10 determines that packet backpressure occurs. By using this method, a prior-art problem can be resolved, system overheads are reduced, and accuracy of packet backpressure detection is improved.

Figure 6:
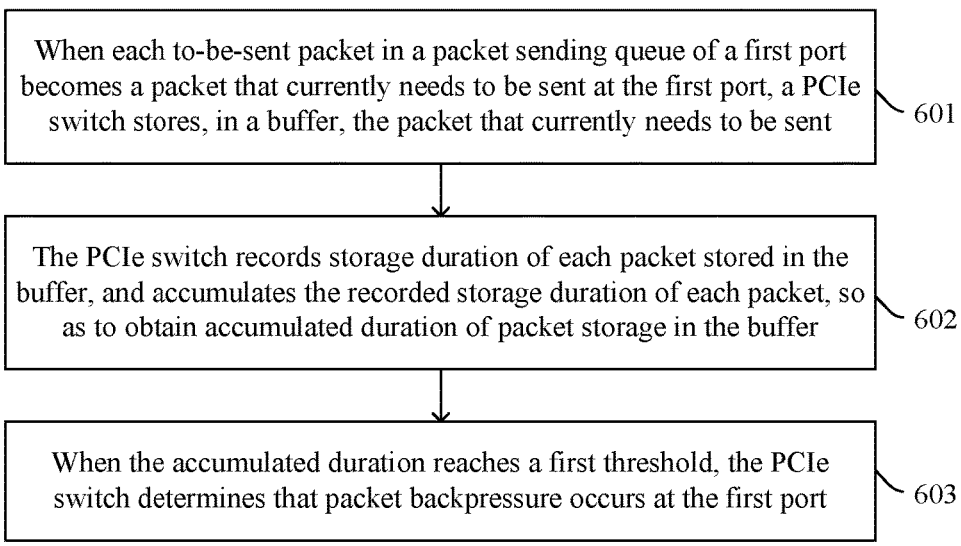
FIG. 6 is a schematic flowchart of a packet backpressure detection method according to an embodiment of this application.

With reference to the PCIe switch provided in FIG. 5, an embodiment of this application provides a method for detecting packet backpressure that occurs at a first port of the PCIe switch. The first port may be either an upstream port or a downstream port of the PCIe switch. Referring to FIG. 6, the packet backpressure detection method includes the following steps.

Step 601: when each to-be-sent packet in a packet sending queue of the first port becomes a packet that currently needs to be sent at the first port, the PCIe switch stores, in a buffer, the packet that currently needs to be sent, where the packet stored in the buffer is removed from the buffer after being sent by using the first port, and the buffer stores a maximum of one packet at any moment.

Specifically, the packet that currently needs to be sent at the first port is a packet that should be first sent among all packets that are not sent at the first port. The buffer stores a maximum of one packet at any moment, and stores a next packet only after the stored packet is sent by using the first port. For an implementation of the buffer, refer to the buffer 13.

Because a packet may be sent in an upstream direction or in a downstream direction of the first port, the buffer is configured to store a packet that currently needs to be sent in one of the directions of the first port. When the first port is an upstream port, the upstream direction of the first port is a direction in which a packet is sent from the first port to a CPU, and the downstream direction of the first port is a direction in which a packet is sent from the first port to a downstream port of the PCIe switch. When the first port is a downstream port, the upstream direction of the first port is a direction in which a packet is sent from the first port to an upstream port of the PCIe switch, and the downstream direction of the first port is a direction in which a packet is sent from the first port to an end point EP device.

Step 602: The PCIe switch records storage duration of each packet stored in the buffer, and accumulates the recorded storage duration of each packet, so as to obtain accumulated duration of packet storage in the buffer.

For example, it is assumed that no packet is stored in the buffer before a time moment t0, and the accumulated duration is 0. A packet 1 enters the buffer at a time moment $t_1$ after t0, and is sent from the first port to a destination end (for example, the EP) at a time moment $t_2$ after $t_1$. Recorded storage duration of the packet 1 in the buffer is $t_2-t_1$, and the accumulated duration of packet storage in the buffer is $t_2-t_1$. A packet 2 enters the buffer at a time moment $t_3$ after $t_2$, and is sent from the first port to the destination end at a time moment $t_4$ after $t_3$. Recorded storage duration of the packet 2 in the buffer is $t_4-t_3$, and the accumulated duration of packet storage in the buffer is $(t_2-t_1)+(t_4-t_3)$.

That the PCIe switch records the storage duration of each packet stored in the buffer may be implemented by a processor of the PCIe switch. The processor may be a general purpose processor such as a CPU, and a function of performing timing on the packet stored in the buffer may be implemented by the processor by executing an application program instruction, or may be implemented by the processor by invoking a hardware module used as a timer. Alternatively, the processor may be an integrated circuit such as an ASIC, and a function of performing timing on the packet stored in the buffer may be implemented by a partial circuit structure in the integrated circuit.

Step 603: When the recorded accumulated duration reaches a first threshold, the PCIe switch determines that packet backpressure occurs at the first port.

Specifically, specific data of the first threshold may be determined by a packet pile-up degree tolerated by a device, and may be set to an empirical value, for example, 60 s. The first threshold may be set in the PCIe switch by default, or may be set by a user. For example, the processor of the PCIe switch includes a configuration unit, and the configuration unit is configured to: receive configuration data of the user, and determine the first threshold according to the configuration data. When the recorded accumulated duration reaches the first threshold, it indicates that a packet sending speed of the first port is excessively slow, and the processor determines that packet backpressure occurs at the first port.

In the packet backpressure detection method, for packet backpressure in one direction of one PCIe port, timing is performed only on storage duration of one packet in the buffer at any moment. Therefore, compared with a prior-art solution in which timing is simultaneously performed on all to-be-sent packets at a PCIe port, this solution can substantially reduce system overheads. In addition, when packet backpressure occurs at the PCIe port due to link failure, the PCIe switch generates a packet backpressure error only once for the link failure, thereby avoiding occurrence of an error storm and improving system stability. Moreover, because whether packet backpressure occurs is determined according to the accumulated duration of packet storage in the buffer, the following case can be avoided: although storage duration of no packet exceeds a specified threshold, a CPU for sending a packet cannot work normally because an accumulated value of storage duration of multiple packets is excessively large. For example, the PCIe switch includes 10 DPs. When the packet backpressure detection method shown in FIG. 2 is used, a timer corresponding to each packet at each DP does not expire, but storage duration of each packet approximates timeout duration. Because the CPU is affected by packet backpressure at the 10 DPs, and storage duration of the packets at the 10 DPs in the cache unit approximates the timeout duration, it is likely that instruction timeout occurs in the CPU.

Figure 7:
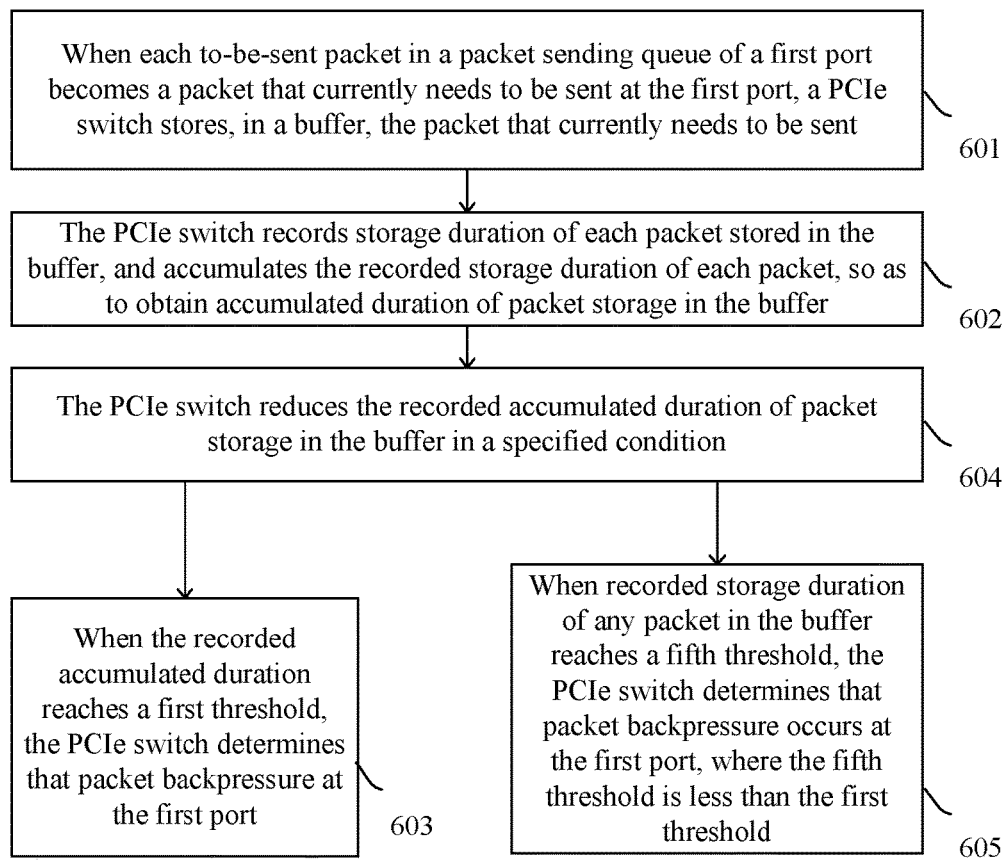
FIG. 7 is a more detailed schematic flowchart of a packet backpressure detection method according to an embodiment of this application.

Optionally, referring to FIG. 7, in this embodiment of this application, the packet backpressure detection method further includes the following step:

Step 604: The PCIe switch reduces the recorded accumulated duration of packet storage in the buffer in a preset condition.

Step 604 may include multiple implementations that include but are not limited to the following manners.

Manner 1: the PCIe switch resets the accumulated duration of packet storage in the buffer 13 to 0 in a preset condition.

Likewise, the manner 1 may have multiple implementations that include the following manners.

In a resetting manner 1, the PCIe switch sets a resetting timer, performs timing, and when a time recorded by the resetting timer reaches a second threshold, resets the accumulated duration of packet storage in the buffer to 0.

For example, the second threshold is set to 600 s. The resetting timer starts to perform timing from 0 s, and once the time reaches 600 s, the processor resets the accumulated duration to 0.

After resetting the accumulated duration to 0, the resetting timer starts to perform timing from 0 again. Alternatively, after resetting the accumulated duration to 0, the resetting timer continues to perform timing based on the recorded second threshold, and when a value of the resetting timer in each time of timing is increased by the second threshold, resets the accumulated duration to 0.

Optionally, a value of the resetting timer may be directly set to a second threshold, and decreases gradually on a basis of the second threshold. When the value of the resetting timer is equal to 0, the accumulated duration is reset to 0.

The resetting timer may be implemented by the processor of the PCIe switch. When the processor is a general purpose processor, the resetting timer may be implemented by the processor by executing an application program instruction, or may be implemented by the processor by invoking a hardware module used as a timer. When the processor is an integrated circuit such as an ASIC, the resetting timer may be implemented by a partial circuit structure in the integrated circuit of the processor.

In a resetting manner 2, the PCIe switch records a quantity of packets that have been stored in the buffer, and when the recorded quantity reaches a third threshold, resets the accumulated duration of packet storage in the buffer to 0.

For example, the third threshold is set to 1024. The PCIe switch starts counting from the first packet that is cached in the buffer, and once a quantity obtained by means of counting reaches 1024, the PCIe switch resets the accumulated duration of packet storage in the buffer to 0.

After resetting the accumulated duration to 0, for packets that have been stored in the buffer after the accumulated duration is reset to 0, the PCIe switch starts counting from 0 again. Alternatively, the PCIe switch continues, based on the recorded third threshold, to count a quantity of packets that have been stored in the buffer, and when a quantity obtained by means of counting is increased by the third threshold, resets the accumulated duration to 0.

That the PCIe switch records a quantity of all packets stored in the buffer may be implemented by the processor of the PCIe switch. When the processor is a general purpose processor, the counting function may be implemented by the processor by executing an application program instruction, or may be implemented by the processor by invoking a hardware module used as a counter. When the processor is an integrated circuit such as an ASIC, the counting function may be implemented by a partial circuit structure in the integrated circuit of the processor.

Either the resetting manner 1 or the resetting manner 2 may be selected for implementation, or both the two resetting manners may be implemented. When both the two resetting manners are implemented, once the time recorded by the resetting timer reaches the second threshold or the quantity that is of packets stored in the buffer and that is obtained by means of counting reaches the third threshold, the PCIe switch resets, to 0, the accumulated duration determined by the resetting timer. In an optional implementation, when the time recorded by the resetting timer reaches the second threshold, the PCIe switch needs to reset, to 0, both the time recorded by the resetting timer and the quantity that is of packets stored in the buffer and that is obtained by means of counting. When the quantity that is of packets stored in the buffer and that is obtained by means of counting reaches the third threshold, the PCIe switch needs to reset, to 0, both the time recorded by the resetting timer and the quantity that is of packets stored in the buffer and that is obtained by means of counting. In another optional implementation, when the time recorded by the resetting timer reaches the second threshold, the PCIe switch resets, to 0, the time recorded by the resetting timer, but does not reset, to 0, the quantity that is of packets stored in the buffer and that is obtained by means of counting. When the quantity that is of packets stored in the buffer and that is obtained by means of counting reaches the third threshold, the PCIe switch resets, to 0, the quantity that is of packets stored in the buffer and that is obtained by means of counting, but does not reset, to 0, the time recorded by the resetting timer.

Because storage duration of any packet that is cached in the buffer is greater than 0, after a sufficient quantity of packets are cached in the buffer, or after a packet is cached in the buffer for an enough long time, the accumulated duration of packet storage in the buffer can certainly reach the first threshold. It can be learned from this embodiment of this application that packet backpressure does not occur in a case in which the accumulated duration of packet storage in the buffer reaches the first threshold because the buffer caches a packet for an excessively long time. Likewise, packet backpressure does not occur in a case in which the accumulated duration of packet storage in the buffer reaches the first threshold because an overlarge quantity of packets are cached in the buffer buffer.

In the manner 1, after a packet is stored in the buffer for an enough long time (that is, the second threshold), or a sufficient quantity (that is, the third threshold) of packets are stored in the buffer, the PCIe switch can reset the accumulated duration of packet storage in the buffer to 0, so that a case in which the PCIe switch determines that packet backpressure occurs at the first port because accumulated storage duration of an overlarge quantity of normal packets other than backpressure packets reaches the first threshold can be avoided, and accuracy of packet backpressure detection is improved.

Manner 2: The storage duration that is of each packet in the buffer and is successively recorded by the PCIe switch forms a duration queue. When a length of the duration queue reaches a fourth threshold, the PCIe switch deletes the first recorded storage duration from the duration queue, and subtracts, from the accumulated duration, the first recorded storage duration that is deleted from the duration queue.

Specifically, the PCIe switch successively records storage duration of packets in the buffer, and the recorded duration forms a duration queue according to a recording sequence. Duration at the beginning of the duration queue is the earliest-recorded storage duration in the duration queue. For example, first, a packet 1 is stored the buffer, and storage duration is $\Delta t_1$. Next, a packet 2 is stored, and storage duration is $\Delta t_2$. Next, a packet 3 is stored, and storage duration is $\Delta t_3$. In this case, the duration queue is ($\Delta t_1$, $\Delta t_2$, $\Delta t_3$), and $\Delta t_1$ at the beginning of the duration queue is the earliest-recorded duration in all the storage duration included in the duration queue. It is assumed that the fourth threshold is 4. A packet 4 is stored in the buffer after the packet 3 is sent, and a resetting timer records storage duration $\Delta t_4$ of the packet 4. In this case, a length of the duration queue reaches 4, and the restting timer deletes the earliest-recorded storage duration $\Delta t_1$ from the duration queue, to form a new duration queue ($\Delta t_2$, $\Delta t_3$, $\Delta t_4$). Correspondingly, the accumulated duration, recorded by the resetting timer, of packet storage in the buffer changes from ($\Delta t_1 + \Delta t_2 + \Delta t_3$) to ($\Delta t_2 + \Delta t_3 + \Delta t_4$).

Figure 8:
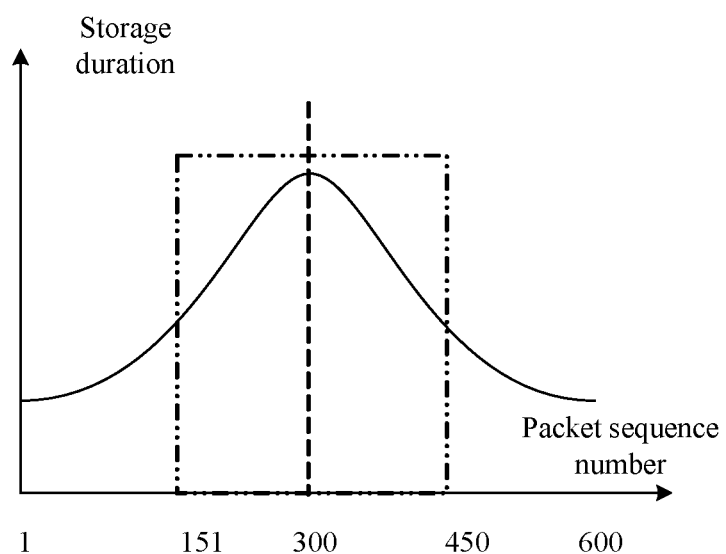
FIG. 8 is a diagram of a relationship between packet storage duration and a packet sequence number.

Referring to a diagram of a relationship between packet storage duration and a packet sequence number shown in FIG. 8, the duration queue is similar to a window having a fixed length. When a new packet is stored in the buffer, the window moves, so that the accumulated duration is a sum of storage duration, in the buffer, of a specified quantity (a value of the specified quantity is the fourth threshold) of packets recently cached in the buffer. By using the window having the fixed length, a peak value of packet storage duration does not fall within two statistical units, so that it is ensured that the peak value of the packet storage duration can always be detected, and sensitivity of packet backpressure detection is improved.

An example that the peak value of packet storage duration falls within two statistical units is as follows: assuming that the third threshold is 300, a packet counter starts counting from a packet whose number is 1, and when counting to a packet whose number is 300, the packet counter resets, to 0, the accumulated duration determined by the resetting timer. Because a sum of storage duration of packets whose numbers are 1 to 300 does not exceed the first threshold, packet backpressure fails to be detected. Likewise, when a packet whose number is 600 is detected, the packet counter again resets, to 0, the accumulated duration determined by the resetting timer. Because a sum of storage duration of packets whose numbers are 301 to 600 does not exceed the first threshold, packet backpressure fails to be detected. However, because the peak value of the packet storage duration appears near the packet whose number is 300, actually, a sum of storage duration of packets whose numbers are 151 to 450 is already greater than the first threshold, and packet backpressure already occurs. However, because the peak value of the packet storage duration falls within two statistical units, packet backpressure fails to be detected.

Either the manner 1 or the manner 2 may be implemented, or both the two manners may be implemented. When both the two manners are implemented, the fourth threshold is set to be less than the third threshold, for example, the third threshold is 1024, and the fourth threshold is 300.

Alternatively, in the manner 2, the PCIe switch accumulates all duration in a duration queue, so as to obtain window duration, and when a length of the duration queue reaches a fourth threshold, deletes the earliest-recorded storage duration from the duration queue, and subtracts, from the window duration, the earliest-recorded storage duration that is deleted from the duration queue. When the window duration reaches a sixth threshold, the PCIe switch determines that packet backpressure occurs at the first port. Because the window duration is not reset to 0, it is ensured that a peak value of packet storage duration can always be detected, and sensitivity of packet backpressure detection is improved.

Optionally, in a possible embodiment of this application, the packet backpressure detection method further includes the following step:

Step 605: When recorded storage duration of any packet in the buffer reaches a fifth threshold, the PCIe switch determines that packet backpressure occurs at the first port, where the fifth threshold is less than the first threshold.

Specifically, the PCIe switch can not only determine, according to the accumulated duration of a packet cache time, whether packet backpressure occurs, but also determine that packet backpressure occurs, provided that storage duration of any packet is greater than the fifth threshold. Therefore, when a packet is cached in the buffer for an excessively long time but the accumulated duration does not exceed the first threshold, the PCIe switch determines as soon as possible that packet backpressure occurs, so that sensitivity of packet backpressure detection is improved. The fifth threshold is less than the first threshold, for example, the first threshold is 60 s, and the fifth threshold is 5 s.

Optionally, in this embodiment of this application, after determining that packet backpressure occurs, the PCIe switch generates a packet backpressure error report, and processes packet backpressure according to the packet backpressure error report. For a manner in which the PCIe switch processes packet backpressure, refer to various packet backpressure processing manners in the prior art, for example, the PCIe switch disconnects a link in which packet backpressure occurs, or sends a message signal interrupt (MSI) to the CPU. In addition, the packet backpressure error report generated by the PCIe switch may further include packet header information of a packet that makes the accumulated duration reach the first threshold.

Optionally, in a possible embodiment of this application, the second threshold to the sixth threshold may be set by default, or may be set by a user. Specifically, the processor of the PCIe switch includes a configuration unit, and the configuration unit is configured to: receive configuration data of the user, and determine the second threshold to the sixth threshold according to the configuration data.

Optionally, in a possible embodiment of this application, a PCIe switch can detect packet backpressure in upstream and downstream two directions of one port (a UP or a DP) of the PCIe switch by using a same processor.

Figure 9:
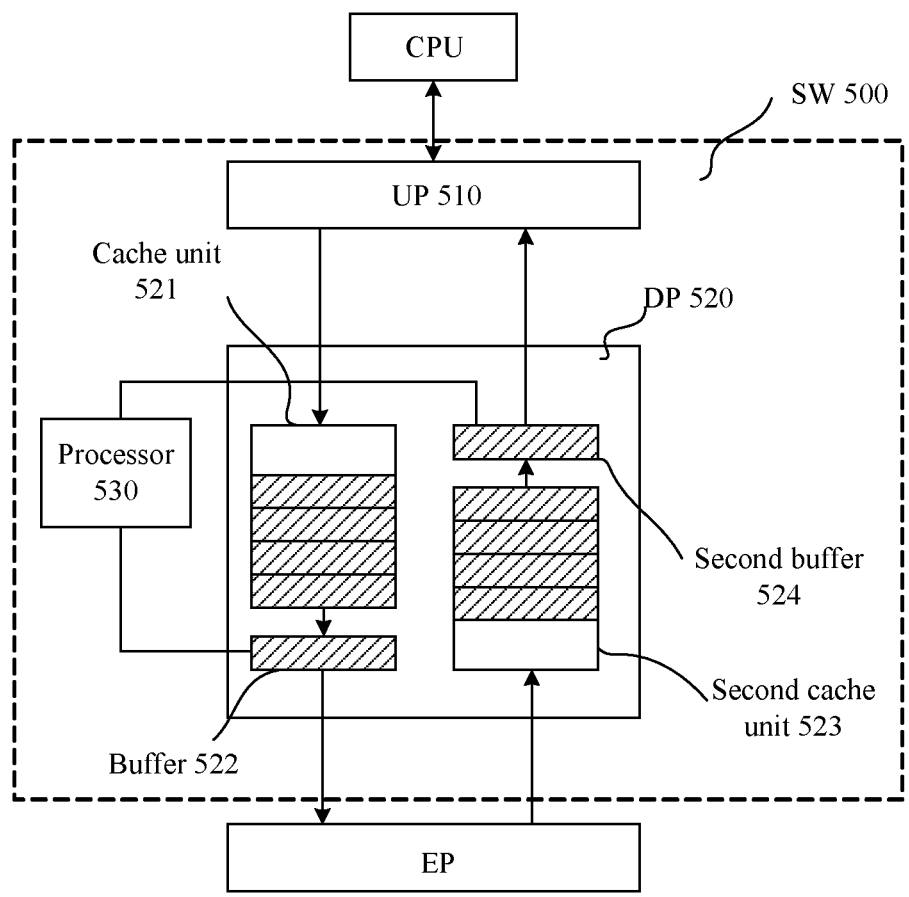
FIG. 9 to FIG. 11 are respectively schematic diagrams of PCIe switches according to an embodiment of this application.

As shown in FIG. 9, a buffer 522 is configured to store a packet that is in a packet sending queue in a sending direction from a DP 520 to an EP and that currently needs to be sent. A second buffer 524 is configured to store a packet that is in a packet sending queue in a sending direction from the DP 520 to a UP 510 and that currently needs to be sent. A second cache unit 523 is configured to store the second packet and a subsequent packet in the packet sending queue in the sending direction from the DP 520 to the UP 510. A processor 530 is configured to: record storage duration of each packet in the buffer 522, and accumulate the recorded storage duration, so as to obtain a first accumulated duration of packet storage in the buffer 522; and when the first accumulated duration reaches a first threshold, determine that packet backpressure occurs at the DP 520. The processor 530 is further configured to: record storage duration of each packet in the second buffer 524, and accumulate the recorded storage duration, so as to obtain second accumulated duration of packet storage in the second buffer 524; and when the second accumulated duration reaches the first threshold, determine that packet backpressure occurs at the DP 520.

In an optional implementation, the processor 530 is configured to reduce the accumulated duration and the second accumulated duration in a prereset condition. The processor 530 reduces the first accumulated duration and the second accumulated duration by using the manner 1, the manner 2, or a combination of the two manners.

For an implementation in which the processor 530 detects packet backpressure in the packet sending direction from the DP 520 to the UP 510 and in the packet sending direction from the DP 520 to the EP, refer to the implementations of step 601 to step 605. Details are not described herein again.

Optionally, in this embodiment of this application, a PCIe switch can detect, by using a same processor, packet backpressure occurs at different ports of the PCIe switch.

Figure 10:
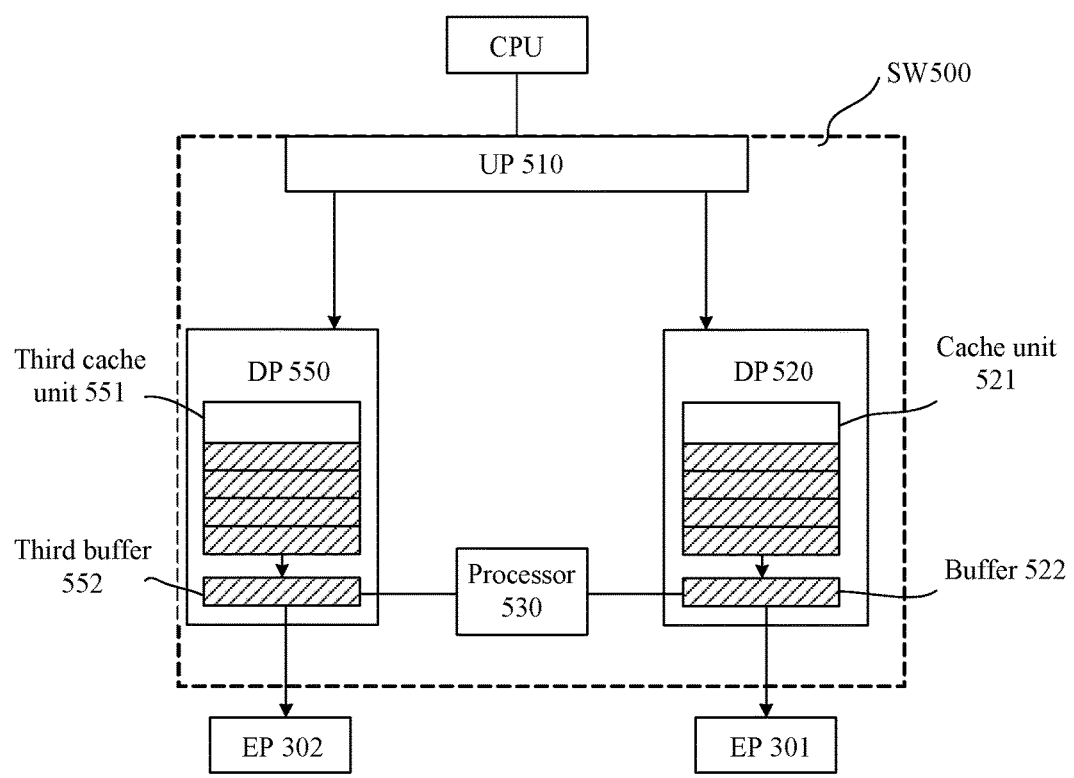

As shown in FIG. 10, a buffer 522 is configured to store a packet that is in a packet sending queue in a sending direction from a DP 520 to an EP 301 and that currently needs to be sent. A third buffer 552 is configured to store a packet that is in a packet sending queue in a sending direction from a DP 550 to an EP 302 and that currently needs to be sent. A third cache unit 551 is configured to store the second packet and a subsequent packet in the packet sending queue in the sending direction from the DP 550 to EP 302. A processor 530 is configured to: record storage duration of each packet in the buffer 522, and accumulate the recorded storage duration, so as to obtain accumulated duration of packet storage in the buffer 522; and when the accumulated duration reaches a first threshold, determine that packet backpressure occurs at the DP 520. The processor 530 is further configured to: record storage duration of each packet in the third buffer 552, and accumulate the recorded storage duration, so as to obtain third accumulated duration of packet storage in the third buffer 552; and when the third accumulated duration reaches the first threshold, determine that packet backpressure occurs at the DP 550.

In an optional implementation, the processor 530 is further configured to: reduce the first accumulated duration in a preset condition, and reduce the third accumulated duration in a preset condition. The processor 530 reduces the first accumulated duration and the third accumulated duration by using the manner 1, manner 2, or a combination thereof.

For an implementation in which the processor 530 detects packet backpressure in the packet sending direction from the DP 520 to the EP 301 and in the packet sending direction from the DP 550 to the EP 302, refer to the implementations of step 601 to step 605. Details are not described herein again.

Optionally, in a possible embodiment of this application, a PCIe switch can detect, by using different processors, packet backpressure that occurs at different ports of the PCIe switch.

Figure 11:
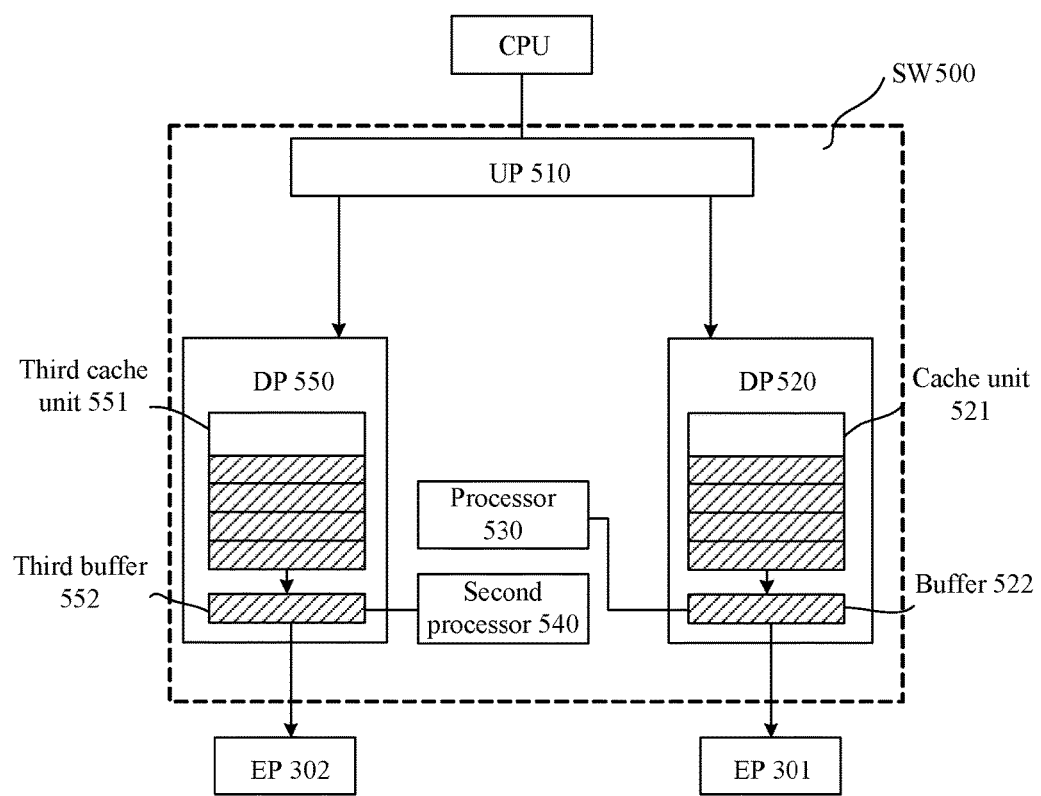

As shown in FIG. 11, a buffer 522 is configured to store a packet that is in a packet sending queue in a sending direction from a DP 520 to an EP 301 and that currently needs to be sent. A third buffer 552 is configured to store a packet that is in a packet sending queue in a sending direction from a DP 550 to an EP 302 and that currently needs to be sent. A processor 530 is configured to: record storage duration of each packet in the buffer 522, and accumulate the recorded storage duration, so as to obtain accumulated duration of packet storage in the buffer 522; and when the accumulated duration reaches a first threshold, determine that packet backpressure occurs at the DP 520. A processor 540 is configured to: record storage duration of each packet in a third buffer 552, and accumulate the recorded storage duration, so as to obtain fourth accumulated duration of packet storage in the third buffer 552; and when the fourth accumulated duration reaches the first threshold, determine that packet backpressure occurs at the DP 550.

In an optional implementation, the processor 530 is further configured to reduce the first accumulated duration in a preset condition, and the processor 540 is further configured to reduce the fourth accumulated duration in a preset condition. The processor 530 and the processor 540 respectively reduce the first accumulated duration and the fourth accumulated duration by using the manner 1, the manner 2, or a combination of the two manners.

For an implementation in which the processor 530 detects packet backpressure in the packet sending direction from the DP 520 to the EP 301 and an implementation in which the processor 540 detects packet backpressure in the packet sending direction from the DP 550 to the EP 302, refer to the implementations of step 601 to step 605. Details are not described herein again.

It should be noted that the packet backpressure detection method corresponding to FIG. 6 to FIG. 11 is also applicable to detecting whether packet backpressure occurs at a PCIe port of a CPU or an EP. Details are not described herein again in this embodiment of this application.

Figure 12:
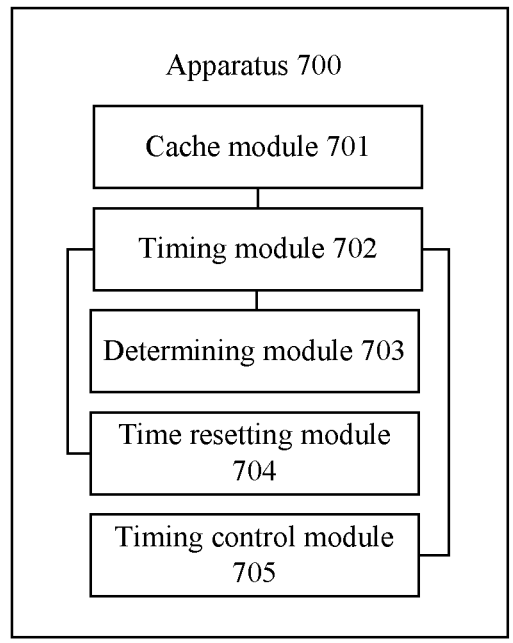
FIG. 12 is a schematic diagram of a packet backpressure detection apparatus 700 according to an embodiment of this application.

FIG. 12 is a schematic diagram of a packet backpressure detection apparatus 700 according to an embodiment of this application. The apparatus 700 is applied to a device having a PCIe port, and the apparatus 700 includes:

a cache module 701, configured to: when each to-be-sent packet in a packet sending queue of the PCIe port becomes a packet that currently needs to be sent at the PCIe port, store, in a buffer, the packet that needs to be sent, where the packet stored in the buffer is removed from the buffer after being sent by using the PCIe port;

a timing module 702, configured to: record storage duration of each packet stored in the buffer, and accumulate the recorded storage duration of each packet, so as to obtain accumulated duration of packet storage in the buffer; and a determining module 703, configured to: when the accumulated duration reaches a first threshold, determine that packet backpressure occurs at the PCIe port.

The apparatus 700 may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. When the packet backpressure detection method shown in FIG. 6 to FIG. 11 is implemented by using software, the apparatus 700 and the modules of the apparatus 700 may be software modules.

Optionally, the buffer of the apparatus 700 stores a maximum of one packet at any moment.

Optionally, the buffer of the apparatus 700 may store at least two packets. Multiple packets are sorted according to a sending sequence in a cache unit. A capacity of the buffer is less than a capacity of the cache unit. The apparatus 700 is configured to: record storage duration of a packet in the buffer, where the packet is the first packet in a packet queue of the buffer, and accumulate recorded storage duration of each packet, so as to obtain accumulated duration of packet storage in the buffer; and when the accumulated duration reaches the first threshold, determine that packet backpressure occurs at the PCIe port.

In an optional implementation, the device may subtract the storage duration of each packet from the first threshold each time after recording storage duration of a packet in the buffer. When the first threshold is less than or equal to 0, the device determines that packet backpressure occurs. By using this method, a prior-art problem can be resolved, system overheads are reduced, and accuracy of packet backpressure detection is improved.

Optionally, in this embodiment of this application, the apparatus 700 further includes:

a time resetting module 704, configured to reset the accumulated duration determined by the timing module to 0 in a preset condition.

Optionally, in this embodiment of this application, the time resetting module 704 is specifically configured to:

set a resetting timer, perform timing, and when a time recorded by the resetting timer reaches a second threshold, reset the accumulated duration determined by the timing module to 0.

Optionally, a value of the resetting timer may be directly set to a second threshold, and decreases gradually on a basis of the second threshold. When the value of the resetting timer is equal to 0, the accumulated duration is reset to 0.

Optionally, in a possible embodiment of this application, the time resetting module 704 is specifically configured to:

record a quantity of packets that have been stored in the buffer, and when the quantity reaches a third threshold, reset the accumulated duration determined by the timing module to 0.

Optionally, in a possible embodiment of this application, the storage duration that is of each packet and is successively recorded by the timing module 702 forms a duration queue, and the apparatus 700 further includes:

a timing control module 705, configured to: when a length of the duration queue reaches a fourth threshold, delete earliest-recorded storage duration from the duration queue, and subtract, from the accumulated duration determined by the timing module, the earliest-recorded storage duration that is deleted from the duration queue.

Optionally, in a possible embodiment of this application, the determining module 703 is further configured to: when storage duration that is of any packet in the buffer and is recorded by the timing module reaches a fifth threshold, determine that packet backpressure occurs at the PCIe port, where the fifth threshold is less than the first threshold.

For implementations of the modules included in the apparatus 700, refer to the implementations of step 601 to step 605. It should be noted that the apparatus 700 is not limited to being applied to a PCIe switch, but may be applied to a CPU or an EP.

Figure 13:
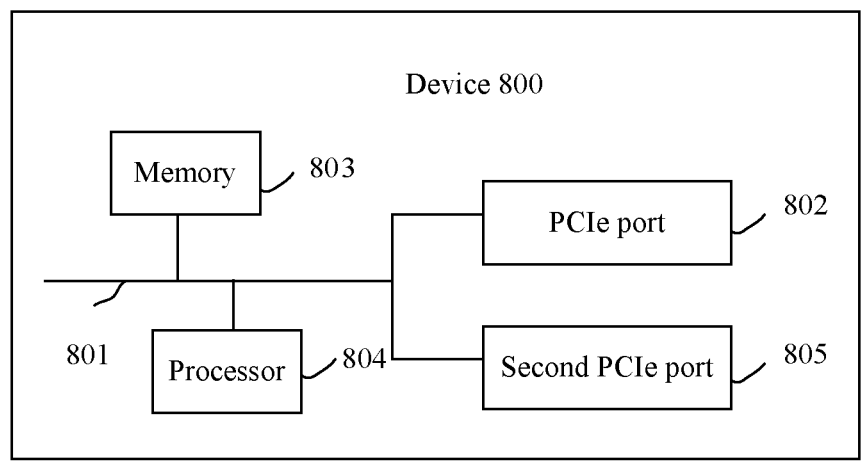
FIG. 13 is a schematic diagram of a packet backpressure detection device 800 according to an embodiment of this application.

FIG. 13 is a schematic diagram of a packet backpressure detection device 800 according to an embodiment of this application. The device 800 includes a bus 801, and a PCIe port 802, a memory 803, and a processor 804 that are separately connected to the bus 801.

The PCIe port 802 is configured to send a packet.

The memory 803 is configured to store a packet sending queue of the PCIe port.

The processor 804 is configured to: when each to-be-sent packet in the packet sending queue of the PCIe port 802 becomes a packet that currently needs to be sent at the PCIe port 802, store, in a buffer, the packet that needs to be sent, where the packet stored in the buffer is removed from the buffer after being sent by using the PCIe port 802; record storage duration of each packet stored in the buffer, and accumulate the recorded storage duration of each packet, so as to obtain accumulated duration of packet storage in the buffer; and when the accumulated duration reaches a first threshold, determine that packet backpressure occurs at the PCIe port 802.

Optionally, in this embodiment of this application, the memory 803 is further configured to store an instruction.

The processor 804 is configured to execute the instruction stored in the memory 803, so as to implement a function of the processor 804.

Optionally, the buffer stores a maximum of one packet at any moment.

Optionally, a capacity of the buffer may be that at least two packets can be stored, and the capacity of the buffer is less than a capacity of a cache unit. The processor 804 is configured to: record storage duration of the first packet in a packet queue of the buffer, and accumulate recorded storage duration of each packet, so as to obtain accumulated duration of packet storage in the buffer.

Optionally, in this embodiment of this application, the processor 804 is further configured to reset the accumulated duration to 0 in a preset condition.

Optionally, in this embodiment of this application, that the processor 804 is specifically configured to:

setting a resetting timer, performing timing, and when a time recorded by the resetting timer reaches a second threshold, resetting the accumulated duration to 0.

Optionally, in this embodiment of this application, that the processor 804 is specifically configured to:

recording a quantity of packets that have been stored in the buffer, and when the quantity reaches a third threshold, resetting the accumulated duration to 0.

Optionally, in this embodiment of this application, the storage duration that is of each packet and is successively recorded by the processor 804 forms a duration queue, and the processor 804 is further configured to:

when a length of the duration queue reaches a fourth threshold, delete the first recorded storage duration from the duration queue, and subtract, from the accumulated duration, the first recorded storage duration that is deleted from the duration queue.

Optionally, in this embodiment of this application, the processor 804 is further configured to:

when recorded storage duration of any packet in the buffer reaches a fifth threshold, determine that packet backpressure occurs at the PCIe port, where the fifth threshold is less than the first threshold.

Optionally, in this embodiment of this application, the device further includes a second PCIe port 805.

The processor 804 is further configured to: when each to-be-sent packet in a packet sending queue of the second PCIe port 805 becomes a packet that currently needs to be sent at the second PCIe port, store, in a third buffer, the packet that needs to be sent at the second PCIe port 805, where the packet stored in the third buffer is removed from the third buffer after being sent by using the second PCIe port 805, and the third buffer stores a maximum of one packet at any moment; record storage duration of each packet stored in the third buffer, and accumulate the recorded storage duration of each packet stored in the third buffer, so as to obtain third accumulated duration of packet storage in the third buffer; and when the third accumulated duration reaches the first threshold, determine that packet backpressure occurs at the second PCIe port 805.

For implementations of the components of the device 800, refer to the implementations of step 601 to step 605. It should be noted that the device 800 is not limited to a PCIe switch, but may also be a CPU or an EP.

The processor 804 may be a CPU, may be an MCPU, or may be another general purpose processor, a digital signal processor (DSP), an application-specific integrated circuit (ASIC), a field-programmable gate array (FPGA), another programmable logic device, or the like. The general purpose processor may be a microprocessor, or the processor may be any conventional processor, or the like. The memory includes: any medium that can store program code, such as a universal serial bus (USB) flash drive, a removable hard disk, a read-only memory (ROM), a random access memory (RAM), a magnetic disk, or an optical disc.

An embodiment of this application provides a server, and the server includes a device 10 that can implement the packet backpressure detection method.

An embodiment of this application provides a storage controller, and the storage controller includes a device 10 that can implement the packet backpressure detection method.

An embodiment of this application further provides a computer-readable medium, configured to store a computer program. The computer program includes an instruction for performing steps in a packet backpressure detection method corresponding to any one of FIG. 6 or FIG. 11 and in any optional implementation of the method.

In an embodiment of this application, combination may be made on a basis of implementations provided in the foregoing aspects, so as to provide more implementations.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, and an optical memory) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Obviously, persons skilled in the art can make various modifications and variations to this application without departing from the spirit and scope of this application. This application is intended to cover these modifications and variations of this application provided that they fall within the scope defined by the following claims of this application and their equivalent technologies.

What is claimed is:

1. A packet backpressure detection method by a device having a Peripheral Component Interconnect Express (PCIe) port, comprising:
storing a plurality of packets that are to be transmitted via the PCIe port in a packet queue in a first buffer and storing a packet that is to be transmitted next in a second buffer;
recording a storage duration of each packet stored in the second buffer;
removing the packet from the second buffer after the packet is transmitted via the PCIe port;
determining that packet backpressure occurs at the PCIe port, when recorded storage duration of any packet in the second buffer reaches a first value, wherein the first value is less than a second value; and
generating an indication of packet backpressure at the PCIe port.

2. The method according to claim 1, wherein the method comprises:
accumulating the storage duration of each packet stored in the second buffer;
determining that packet backpressure occurs at the PCIe port, when the accumulated storage duration reaches the second value, generating an indication of packet pressure at the PCIe port based on the accumulated storage duration.

3. The method according to claim 1, wherein:
the second buffer stores a maximum of one packet at any moment.

4. The method according to claim 1, further comprising:
the second buffer stores at least two packets of one packet at any moment, the first buffer is smaller in size than the second buffer.

5. The method according to claim 2, further comprising:
resetting the accumulated storage duration to 0 in a preset condition.

6. The method according to claim 5, wherein the step of resetting by device comprises:
setting a reset timer, performing timing, and when a time recorded by the reset timer reaches a second value, resetting the accumulated storage duration to 0.

7. The method according to claim 5, wherein the step of resetting by the device comprises:
recording a quantity of packets that have been stored in the second buffer, and when the quantity reaches a third value, resetting the accumulated storage duration to 0.

8. The method according to claim 1, wherein the storage duration that is of each packet and is successively recorded by the device forms a duration queue, and the method further comprises:
when a length of the duration queue reaches a fourth value, deleting the earliest-recorded storage duration from the duration queue, and subtracting, from the accumulated storage duration, the earliest-recorded storage duration that is deleted from the duration queue.

9. The method according to claim 1, wherein the storing a packet in a packet queue that is to be transmitted next in a second buffer comprises:
when each packet in a packet queue in a first direction of the PCIe port becomes a packet that is to be transmitted next in the second buffer at the PCIe port, storing, in the second buffer, the packet that needs to be sent in the first direction, wherein the first direction is an upstream direction or a downstream direction of the PCIe port; and the method further comprises:
when each packet in a packet queue in a second direction of the PCIe port becomes a packet that is to be transmitted next in the second buffer at the PCIe port, storing, in a third buffer, the packet that needs to be sent in the second direction, wherein the second direction is opposite to the first direction, the packet stored in the third buffer is removed from the third buffer after being sent by using the PCIe port, and the third buffer stores a maximum of one packet at any moment;
recording storage duration of each packet stored in the third buffer, and accumulating the recorded storage duration of each packet stored in the third buffer;
removing the packet from the third buffer after the packet is transmitted via the PCIe port; and when the second accumulated duration reaches the sixth value, generating a second indication of packet pressure at the PCIe port based on the second accumulated storage duration.

10. A packet backpressure detection device, comprising a processor, a memory, and a PCIe port, the memory having a plurality of instructions stored thereon, that when executed by the processor, cause the processor to:
store a plurality of packets that are to be transmitted via the PCIe port in a packet queue in a first buffer and store a packet that is to be transmitted next in a second buffer;
record a storage duration of each packet stored in the second buffer;
remove the packet from the second buffer after the packet is transmitted via the PCIe port;
determine that packet backpressure occurs at the PCIe port, when recorded storage duration of any packet in the second buffer reaches a first value, wherein the first value is less than the second value;
generate an indication of packet backpressure at the PCIe port.

11. The method according to claim 10, wherein when executed by the processor, cause the processor to:
accumulating the storage duration of each packet stored in the second buffer;
determine that packet backpressure occurs at the PCIe port, when the accumulated storage duration reaches a first value, generate an indication of packet pressure at the PCIe port based on the accumulated storage duration.

12. The packet backpressure detection device according to claim 10, wherein:
the second buffer stores a maximum of one packet at any moment.

13. The packet backpressure detection device according to claim 10, wherein:
the second buffer stores at least two packets of one packet at any moment, the first buffer is smaller in size than the second buffer.

14. The packet backpressure detection device according to claim 11, wherein the processor is configured to:
reset the accumulated duration to 0 in a preset condition.

15. The packet backpressure detection device according to claim 14, wherein the processor is configured to:
set a resetting timer, performing timing, and when a time recorded by the resetting timer reaches a second value, resetting the accumulated duration to 0.

16. The packet backpressure detection device according to claim 14, wherein the processor is configured to:
record a quantity of packets that have been stored in the second buffer, and when the quantity reaches a third value, reset the accumulated duration to 0.

17. The packet backpressure detection device according to claim 10, wherein the processor is configured to:
when a length of the duration queue reaches a fourth value, delete the earliest-recorded storage duration from the duration queue, and subtract, from the accumulated duration, the earliest-recorded storage duration that is deleted from the duration queue.

18. The packet backpressure detection device according to claim 10, wherein the processor is configured to:
when each packet in a packet queue in a first direction of the PCIe port becomes a packet that is to be transmitted next in the first buffer at the PCIe port, store, in the second buffer, the packet that needs to be sent in the first direction, wherein the first direction is an upstream direction or a downstream direction of the PCIe port; and
when each packet in a packet queue in a second direction of the PCIe port becomes a packet that is to be transmitted next in the first buffer at the PCIe port, store, in a third buffer, the packet that needs to be sent in the second direction, wherein the second direction is opposite to the first direction, the packet stored in the third buffer is removed from the third buffer after being sent by using the PCIe port, and the third buffer stores a maximum of one packet at any moment;
record, storage duration of each packet stored in the third buffer, and accumulate the recorded storage duration of each packet stored in the third buffer;
removing the packet from the third buffer after the packet is transmitted via the PCIe port ;and
when the second accumulated storage duration reaches the sixth value, generating a second indication of packet pressure at the PCIe port based on the second accumulated storage duration.

19. A non-transitory computer-readable storage medium comprising instructions which, when executed by a computer, cause the computer to carry out steps:
storing a plurality of packets that are to be transmitted via the PCIe port in a packet queue in a first buffer and storing a packet that is to be transmitted next in a second buffer;
recording a storage duration of each packet stored in the first buffer;
removing the packet from the second buffer after the packet is transmitted via the PCIe port and subtracting the storage duration of the packet from the accumulated storage duration;
determine that packet backpressure occurs at the PCIe port, when recorded storage duration of any packet in the second buffer reaches a first value, that is less than a second value; and
generating an indication of packet pressure at the PCIe port.

20. A packet backpressure detection method by a device having a Peripheral Component Interconnect Express (PCIe) port, comprising:
storing a plurality of packets for transmission via the PCIe port in a packet queue in a first buffer and storing a packet that is to be transmitted next in a second buffer;
recording a storage duration of each packet stored in the second buffer, and accumulating the storage duration of each packet stored in the second buffer;
removing the packet from the first buffer after the packet is transmitted via the PCIe port;
generating an indication of packet pressure at the PCIe port based on the accumulated storage duration; and
deleting the earliest-recorded storage duration from the accumulated storage duration when a length of the duration queue reaches a fourth value.

21. A packet backpressure detection device, comprising a processor, a memory, and a PCIe port, the memory having a plurality of instructions stored thereon, that when executed by the processor, cause the processor to:
store a plurality of packets for transmission via the PCIe port in a packet queue in a first buffer and storing a packet that is to be transmitted next in a second buffer, wherein the packet queue comprises a plurality of packets that are to be transmitted;

record a storage duration of each packet stored in the second buffer, and accumulating the storage duration of each packet stored in the second buffer;
remove the packet from the second buffer after the packet is transmitted via the PCIe port;
generate an indication of packet pressure at the PCIe port based on the accumulated storage duration; and
delete the earliest-recorded storage duration from the accumulated storage duration when a length of the duration queue includes four accumulated values.

* * * * *

UNITED STATES PATENT AND TRADEMARK OFFICE
CERTIFICATE OF CORRECTION

PATENT NO. : 10,599,549 B2
APPLICATION NO. : 16/250168
DATED : March 24, 2020
INVENTOR(S) : Zhang et al.

It is certified that error appears in the above-identified patent and that said Letters Patent is hereby corrected as shown below:

On the Title Page

In Column 1, above "(51) Int. Cl." insert
-- (30) Foreign Application Priority Data
Sep. 30, 2016 (CN) .............. 2016 1 01304 --.

In the Specification

In Column 11, Line 63, delete "to," and insert -- $t_0$, --, therefor.

In Column 11, Line 65, delete "to," and insert -- $t_0$, --, therefor.

In Column 14, Line 36, delete "buffer buffer." and insert -- buffer. --, therefor.

In Column 15, Line 3, delete "restting" and insert -- resetting --, therefor.

In the Claims

In Column 23, in Claim 11, Line 24, delete "method" and insert -- packet backpressure detection device --, therefor.

Signed and Sealed this
Thirty-first Day of January, 2023

Katherine Kelly Vidal
*Director of the United States Patent and Trademark Office*